(12) United States Patent
Shin et al.

(10) Patent No.: US 10,761,715 B2
(45) Date of Patent: Sep. 1, 2020

(54) APPARATUS AND METHOD FOR SHARING CONTENTS

(71) Applicant: PIXTREE TECHNOLOGIES, INC., Seoul (KR)

(72) Inventors: Jae Seob Shin, Seoul (KR); Yeon Bae Kim, Seoul (KR); Se Hoon Son, Seoul (KR); Mun Sup Song, Gunpo-si (KR); Hun Chan Yu, Seoul (KR)

(73) Assignees: PIXTREE TECHNOLOGIES, INC., Seoul (KR); SK TELECOM CO., LTD., Seoul (KR)

( * ) Notice: Subject to any disclaimer, the term of this patent is extended or adjusted under 35 U.S.C. 154(b) by 672 days.

(21) Appl. No.: 15/081,181

(22) Filed: Mar. 25, 2016

(65) Prior Publication Data

US 2016/0210016 A1 Jul. 21, 2016

Related U.S. Application Data

(63) Continuation of application No. PCT/KR2014/008779, filed on Sep. 22, 2014.

(30) Foreign Application Priority Data

Sep. 25, 2013 (KR) .................. 10-2013-0114074

(51) Int. Cl.
*G06F 3/0488* (2013.01)
*H04N 21/4363* (2011.01)
(Continued)

(52) U.S. Cl.
CPC .......... *G06F 3/0488* (2013.01); *G06F 3/0482* (2013.01); *G06F 3/0486* (2013.01);
(Continued)

(58) Field of Classification Search
CPC .... G06F 3/0488; G06F 3/0482; G06F 3/0486; H04L 51/10; H04N 21/47217; H04N 21/43637; H04N 21/41407
See application file for complete search history.

(56) References Cited

U.S. PATENT DOCUMENTS 9,582,157 B1 * 2/2017 Chatterjee ............. G06F 16/738
2007/0005768 A1 * 1/2007 Won ..................... H04L 65/4084
709/225

(Continued)

FOREIGN PATENT DOCUMENTS

CN          102999251 A      3/2013
EP           2237139 A2     10/2010
(Continued)

OTHER PUBLICATIONS

Chinese Office Action dated Apr. 24, 2018 in connection with the counterpart Chinese Patent Application No. 201480064092.8, citing the above reference(s).

(Continued)

*Primary Examiner* — John T Repsher, III

(74) *Attorney, Agent, or Firm* — Hauptman Ham, LLP

(57) ABSTRACT

An apparatus for sharing contents includes: a touch screen to sense a user's touch input for one or more contents; a processor to detect the user's touch input, and generate a transmission image according to instructions corresponding to the detected user's touch input to share the one or more contents with an external device; and a communication unit to establish connection with the external device, and transmit the transmission image to the external device.

11 Claims, 9 Drawing Sheets

(51) Int. Cl.
*H04N 21/472* (2011.01)
*H04N 21/414* (2011.01)
*G06F 3/0482* (2013.01)
*H04L 12/58* (2006.01)
*G06F 3/0486* (2013.01)

(52) U.S. Cl.
CPC ....... *H04L 51/10* (2013.01); *H04N 21/41407* (2013.01); *H04N 21/43637* (2013.01); *H04N 21/47217* (2013.01)

(56) References Cited

U.S. PATENT DOCUMENTS

| | | | |
|---|---|---|---|
| 2008/0307324 A1 | 12/2008 | Westen et al. | |
| 2010/0017745 A1* | 1/2010 | Kikuchi | G06F 3/1454 715/781 |
| 2011/0265003 A1* | 10/2011 | Schubert | G06F 3/048 715/716 |
| 2012/0191832 A1* | 7/2012 | Kim | H04L 12/2812 709/223 |
| 2013/0162502 A1* | 6/2013 | Lee | G09G 5/003 345/1.2 |
| 2013/0227471 A1 | 8/2013 | Cha et al. | |
| 2014/0053078 A1* | 2/2014 | Kannan | H04W 4/023 715/748 |
| 2014/0075056 A1* | 3/2014 | Shin | G06F 1/1615 710/20 |
| 2014/0199947 A1* | 7/2014 | Jung | H04B 7/26 455/68 |

FOREIGN PATENT DOCUMENTS

| | | |
|---|---|---|
| EP | 2574069 A1 | 3/2013 |
| JP | 2001142825 A | 5/2001 |
| JP | 2011090461 A | 5/2011 |
| JP | 2012164319 A | 8/2012 |
| KR | 10-2011-0128487 A | 11/2011 |
| KR | 10-2012-0062136 A | 6/2012 |
| KR | 10-2012-0063328 A | 6/2012 |
| KR | 10-2013-0043935 A | 5/2013 |
| WO | 2003015451 A1 | 2/2003 |

OTHER PUBLICATIONS

Extended European search report dated Apr. 21, 2017 in connection with the European Patent Application No. 14847138.6-1908, citing the above reference(s).
International Search Report dated Nov. 27, 2014 for PCT/KR2014/008779, citing the above reference(s).

\* cited by examiner

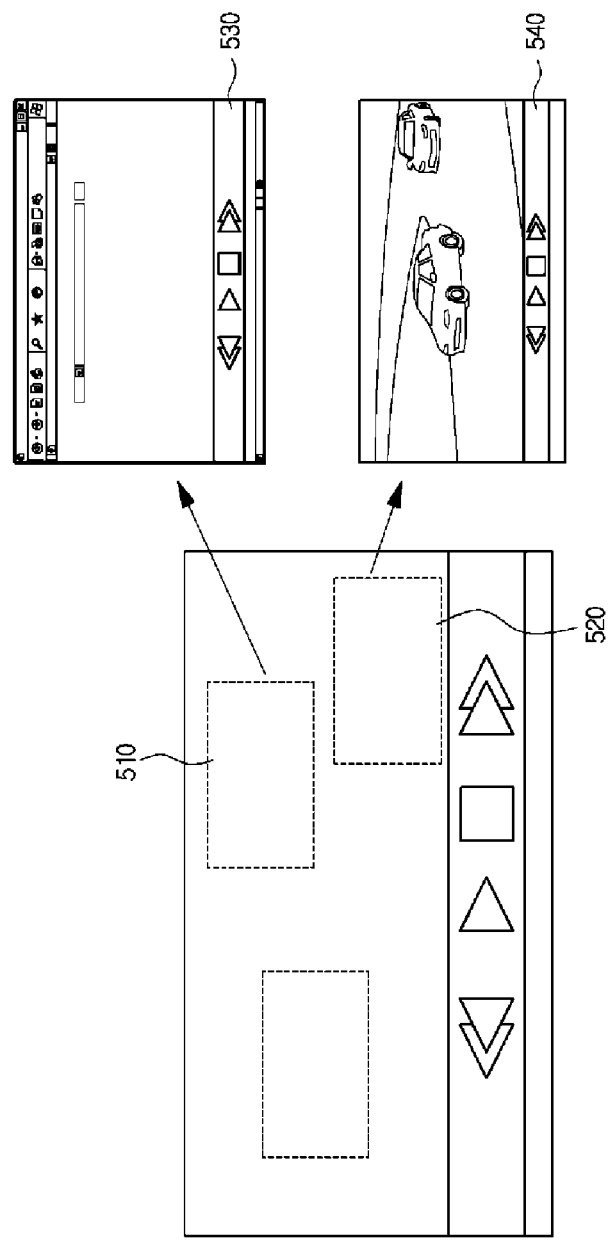

APPARATUS AND METHOD FOR SHARING CONTENTS

CROSS-REFERENCE TO RELATED APPLICATIONS

The present application is a continuation of International Patent Application No. PCT/KR2014/008779, filed Sep. 22, 2014, which is based upon and claims the benefit of priority to Korean Patent Application No. 10-2013-0114074, filed on Sep. 25, 2013. The disclosures of the above-listed applications are hereby incorporated by reference herein in their entirety.

TECHNICAL FIELD

This disclosure relates to a method and apparatus for playing back and sharing a plurality of contents.

BACKGROUND ART

The statements in this section merely provide background information related to the present disclosure and do not necessarily constitute prior art.

Mobile devices, such as smartphones and the like, play back one of contents, such as videos and the like, at a time due to limited performance. However, the inventor(s) has noted that the recent change in decoding of contents such as videos not only from software but also from hardware allows a plurality of contents to be played back at a time in mobile devices.

The inventor(s) has noted that mobile devices can provide the function of sharing images, which are obtained by playing back a plurality of contents, with external device. However, the inventor(s) has experienced that known user interface is inconvenient for users to connect a smartphone having a display module to any external devices and instruct the smartphone to share any contents with the external devices.

SUMMARY

In accordance with some embodiments, an apparatus for sharing contents comprises a touch screen, a processor and a communication unit. The touch screen is configured to sense a user's touch input for one or more contents. The processor is configured to detect the user's touch input, and generate a transmission image according to instructions corresponding to the detected user's touch input to share the one or more contents with an external device. And the communication unit is configured to establish connection with the external device, and transmit the transmission image to the external device. Herein, the processor is configured to display a device list including an area corresponding to the external device, connect the apparatus to the external device according to a user input of dragging a first content of the one or more contents and dropping the first content onto an area corresponding to the external device on the device list, generate the transmission image, and transmit the transmission image to the external device through the communication unit.

In accordance with some embodiments, a method performed by an apparatus for contents sharing, the method comprises: displaying a device list including an area corresponding to an external device; detecting a user input of dragging a first content of the contents and dropping the first content onto an area corresponding to the external device on the device list; connecting the apparatus to the external device according to the detected user input; generating a transmission image; and transmitting the transmission image to the external device.

DESCRIPTION OF DRAWINGS

FIG. 7 is a schematic view of a screen on which a transmission image generated by the contents sharing apparatus according to at least one embodiment of the present disclosure is displayed.

DETAILED DESCRIPTION

Figure 1:
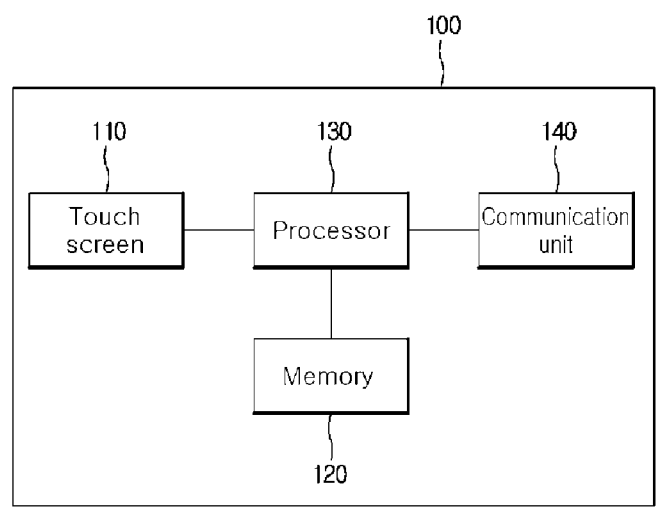
FIG. 1 is a schematic block diagram of contents sharing apparatus according to at least one embodiment of the present disclosure.

The present disclosure can be modified in various ways and practiced with many embodiments. Hereinafter, some embodiments of the present disclosure will be described in detail with reference to the drawings. Like reference numerals in the drawings denote like elements. In the following description of the present disclosure, a detailed description of known functions and configurations incorporated herein will be omitted when it makes the subject matter of the present disclosure unclear. However, the present disclosure is not limited to the disclosed embodiments and it is to be understood that modifications, equivalents and substitutes thereof are made and fall within the scope of the claimed invention set forth in the claims.

The present disclosure is to provide an apparatus and method for sharing contents, which is capable of allowing a user to input an instruction to play back and share a plurality of contents on a limited screen of a mobile device.

To aid in understanding of the present disclosure, the terms used in the following description are defined as follows.

It will be understood that the terms "comprises" and/or "comprising," or "includes" and/or "including" when used in this specification, specify the presence of stated components, but do not preclude the presence or addition of one or more other components. The term "unit" or "module" specifies a unit performing at least one function or operation and implementable as hardware, software or a combination thereof.

'Content' is consisting of, for example, text message, web content, video, audio, images, applications, and etc. 'Content' can be provided in a streaming or download manner. 'Content' can be divided into one or more part in a predetermined chunk unit and store at a single or multiple storages of at least one local caching device, at least one user equipment, and/or at least one content providing device.

Mobile device indicates, for example, hand-held mobile (or hand-carry, or portable) terminal device, a user equipment, and it is not limited thereto and includes all kinds of devices comprising one or more processors and/or application-specific integrated circuits (ASICs) specified for implementing respectively corresponding operations and functions described herein in the present disclosure. Mobile device also represents, for example, a personal computer (PC), a tablet PC, a notebook computer, a personal digital assistant (PDA), a portable multimedia player (PMP), a PlayStation Portable (PSP), a mobile communication terminal, and the like, and means various apparatuses including a communication device such as a communication modem that performs communication with various devices or wired/wireless communication networks (herein, the wire or wireless networks include, for example, one or more network interfaces including, but not limited to, cellular, Wi-Fi, LAN, WAN, CDMA, WCDMA, GSM, LTE and EPC networks, and cloud computing networks), a memory that stores various programs and data to encode images, a microprocessor that executes programs so as to perform calculation and control, and the like.

The phase of "transmitting a signal from one element to another" refers to not only transmitting the signal through direction connection from the one element to the another element but also transmitting the signal via still another element between the one element and the another element, unless stated otherwise.

FIG. 1 is a schematic block diagram of contents sharing apparatus according to at least one embodiment of the present disclosure.

Referring to FIG. 1, contents sharing apparatus 100 includes a touch screen panel 110 (hereinafter, referred to as "touch screen"), a memory 120, a processor 130 and a communication unit 140. The contents sharing apparatus 100 further comprises a display panel (not shown in FIG. 1) such as, e.g., liquid crystal display (LCD), light-emitting diode (LED) and etc., as a input element thereof. The touch screen 110 is embodied or built in the display panel. The touch screen 110 includes a physical screen, not limited thereto, and a virtual screen. The touch screen 110 is an exemplary input and/or output element included in the contents sharing apparatus, to display images, texts, video and other information, as well as to sense user's inputs. Herein, the user's inputs indicate, for example, physical touch inputs on the physical touch screen, not limited thereto, as well as touch in air on a virtual touch screen presented by, for example, virtual reality gear (e.g., wearable virtual reality glasses).

The touch screen 110 displays images received from the processor 130. The touch screen 110 receives a touch input from a user through a finger or pen which touches on the touch screen 110, and generates input information based on the received touch input. In this case, the touch input includes one or more of an input of user's touching on the touch screen 110, an input of release of the finger or pen from the touch screen, an input of dragging of movement of the finger or pen on the touch screen 110 in touch with touch screen 100, and a touch pressure. The input information is information indicating the above-mentioned inputs. The touch screen 110 transmits the input information to the processor 130.

The memory 120 stores one or more contents and a program including a user interface and instructions for playbacks of the contents.

The processor 130 generates content such as an image to be played back through the user interface, according to an instruction stored in the memory 120, and transmits it to the touch screen 110. A process of the processor 130 to generate the image through the user interface and display the image on the touch screen 110 is obvious to those skilled in the art and, therefore, explanation of which is omitted for the purpose of brevity. The user interface, configured in the touch screen of the display panel, includes a thumbnail image area in which contents being played back are displayed as thumbnail images, and a main area in which contents are displayed at positions and sizes set by the user. At this time, when a user touches one of the contents displayed as the thumbnail images and drags it into one side in the main area, the processor 130 detects the user's touches and displays a device list listing one or more external devices which are connected with the contents sharing apparatus 100. In this case, the device list includes icons or buttons for each of the one or more external devices which are connected with the contents sharing apparatus 100. In addition, the processor 130 establishes connection with an external device through the communication unit 140 and generates a transmission image to be transmitted to the connected external device. For example, the processor 130 generates a transmission image (first content 210) to be played back on the entire screen. The processor 130 transmits the transmission image to the external device through the communication unit 140. In this case, the external device is a mobile device or a device such as a television, or LCD and/or LED monitor which is connected to the communication unit 140 via a predetermined communication protocol and receives and displays the transmission image.

The communication unit 140 is connected to the external device and transmits the transmission image to the connected external device according to control of the processor 130. In addition, the communication unit 140 receives contents from the external device and transmits them to the processor 130. In this case, the processor 130 stores the contents in the memory 120 for later playback. In addition, the communication unit 140 includes a plurality of communication modules of types known in the art. The communication unit 140 includes a communication module to transmit/receive contents, for example, in a form of electrical or optical signals, to/from external devices and to perform communication with various types of devices or wired/wireless communication networks such as the Internet, wireless personal area network (WPAN), wireless local area network (WLAN), WiBro (wireless broadband, aka WiMax) network, mobile communication network, personal area networks (PANs) such as near field communication (NFC) and Bluetooth®, and the like or through various communication interfaces such as, for example, an air, a cable, a universal serial bus (USB) and the like.

Figure 2:
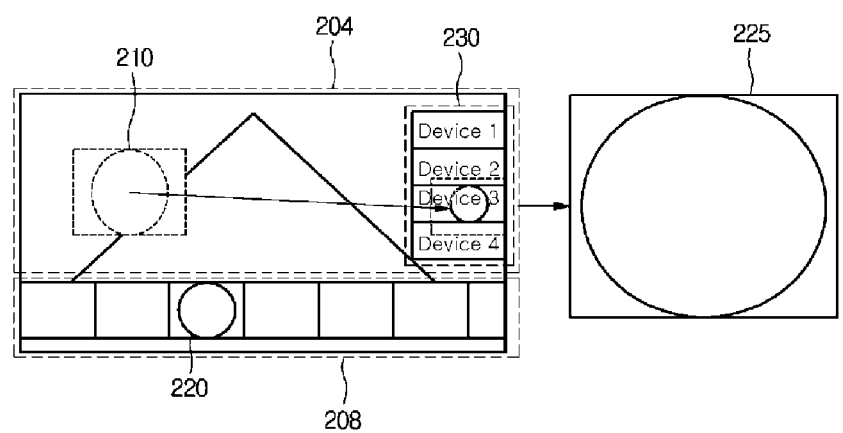
FIG. 2 is a schematic view of an example where the contents sharing apparatus according to at least one embodiment of the present disclosure shares contents through a user interface.

FIG. 2 is a schematic view of an example where the contents sharing apparatus according to at least one embodiment of the present disclosure shares contents through a user interface.

Referring to FIG. 2, a plurality of contents are played back as thumbnail images in the thumbnail image area 208. When the processor 130 receives an input of touching content 210 of the contents and dragging it to a point in the main area 204 from a user, the processor 130 moves the content 210 to the point. It is here assumed that the processor 130 is playing back the first content 210 on the main area 204 according to a predetermined input from a user.

The processor 130 receives a user input of touching, dragging and dropping the first content 210 being played back in the main area 204 through the touch screen 110 onto one of areas corresponding to devices (for example, an area corresponding to device 3 in a device list 230 with reference to FIG. 2) displayed on the device list 230. It is here assumed that the device list 230 displays the areas corresponding to the devices to each indicate that device 1, device 2, device 3 and device 4 are connected with the contents sharing apparatus 100.

The processor 130 performs (or establishes) a connection with a device corresponding to an area onto which the corresponding content is dropped according to the content dropping input, generates a transmission image obtained by mirroring the first content 210 according to the corresponding input detected by the processor, and transmits the transmission image to the device (for example, device 3 as shown in FIG. 2) corresponding to the corresponding area through the communication unit 140.

Figure 3:
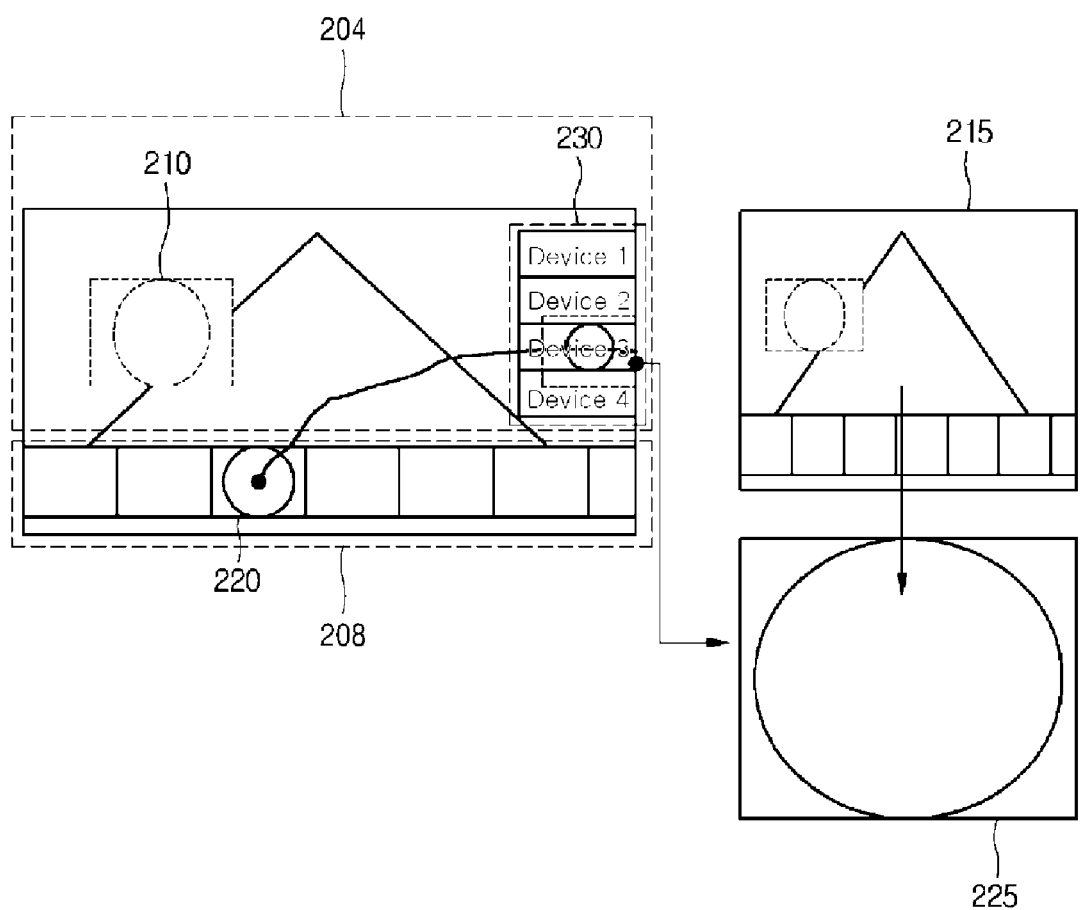
FIG. 3 is a schematic view of another example where the contents sharing apparatus according to at least one embodiment of the present disclosure shares contents through a user interface.

In addition, the processor 130 receives a user input of touching, dragging and dropping the second content 220, which is one of the contents in the thumbnail image area 208, through the touch screen 110 onto one of the areas (i.e., "Device 1" thru "Device 4" as shown in FIG. 3) corresponding to the devices displayed on the device list 230. The processor 130 generates a transmission image 215 obtained by mirroring the second content 220 according to the corresponding input, and transmits the transmission image to the device (i.e., device 225 as shown in FIG. 2) corresponding to the corresponding area through the communication unit 140.

FIG. 3 is a schematic view of another example where the contents sharing apparatus according to at least one embodiment of the present disclosure shares contents through the user interface.

Referring to FIG. 3, when a predetermined event (for example, touch of a predetermined button by a user) occurs, the contents sharing apparatus 100 generates a transmission screen 215 obtained by mirroring the screen of the contents sharing apparatus and transmit the transmission screen 215 to an external device 225 among the device list 230. At this time, when the user drags an image (for example, the first content 210) in the main area 204 on the touch screen 110 or one thumbnail image (for example, a thumbnail image of the second content 220) in the thumbnail image area 208 and drops it onto a particular area (i.e., an area corresponding to "device 3" in the area of the device list 230) corresponding to the external device 225 to which the transmission screen 215 obtained by mirroring the screen of the contents sharing apparatus 100 on the device list 230 is being transmitted, the processor 130 generates a transmission image of the first content 210 or the second content 220 displayed on the entire screen and transmits the transmission image to a device (for example, the external device 225 corresponding to device 3 with reference to FIG. 3) corresponding to the corresponding particular area. Accordingly, the device 225 which received the corresponding transmission image outputs the first content 210 or the second content 220. That is, when content located on the main area 204 is output to an external device through drag and drop, the contents sharing apparatus 100 according to one embodiment of the present disclosure generates a transmission image 215 obtained by mirroring the screen of the contents sharing apparatus 100. In addition, when a content located on the thumbnail image area 208 is output to an external device through drag & drop, the contents sharing apparatus generates a transmission image of the corresponding content located on the thumbnail image area 208, which is displayed on the entire screen.

Accordingly, the processor 130 sends an external device an instruction to request a display through a screen mirroring a particular content simply through a drag & drop input for contents through a touch screen 110. That is, for an input of selecting a content to be shared and selecting a device to which a transmission image is to be transmitted, through predetermined menus and buttons, unlike a PC, an input through the touch screen 100 is likely to produce a wrong manipulation. Further, this is a time-consuming task since a process of selecting items from various menus has to be repeatedly performed and many touches must be performed, which imposes a high degree of fatigue on a user. To overcome this problem, the contents sharing apparatus 100 disclosure allows a user to intuitively and simply input an instruction to request contents sharing between devices through the touch screen 110.

Figure 4:
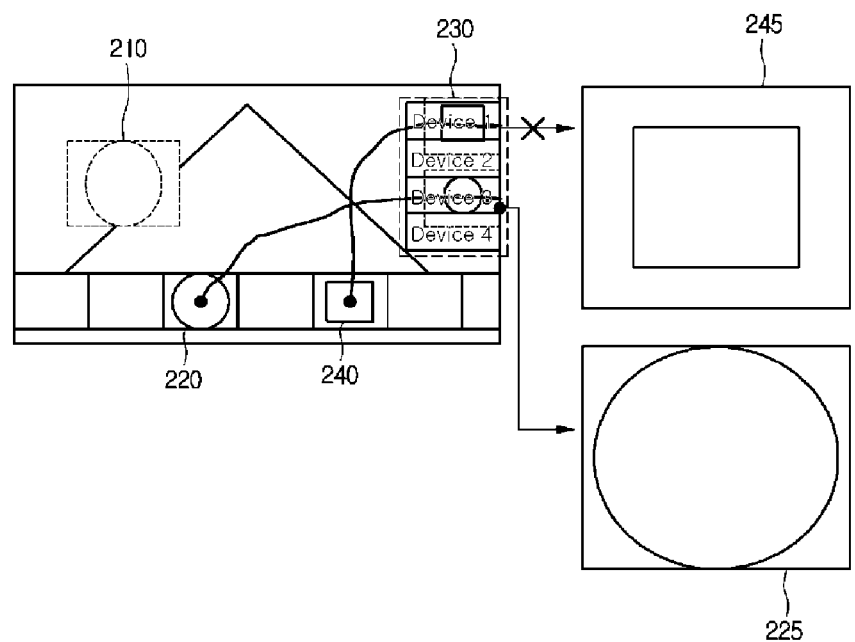
FIG. 4 is a schematic view of one example of a process in which the contents sharing apparatus according to at least one embodiment of the present disclosure shares contents for a plurality of devices.
Figure 5:
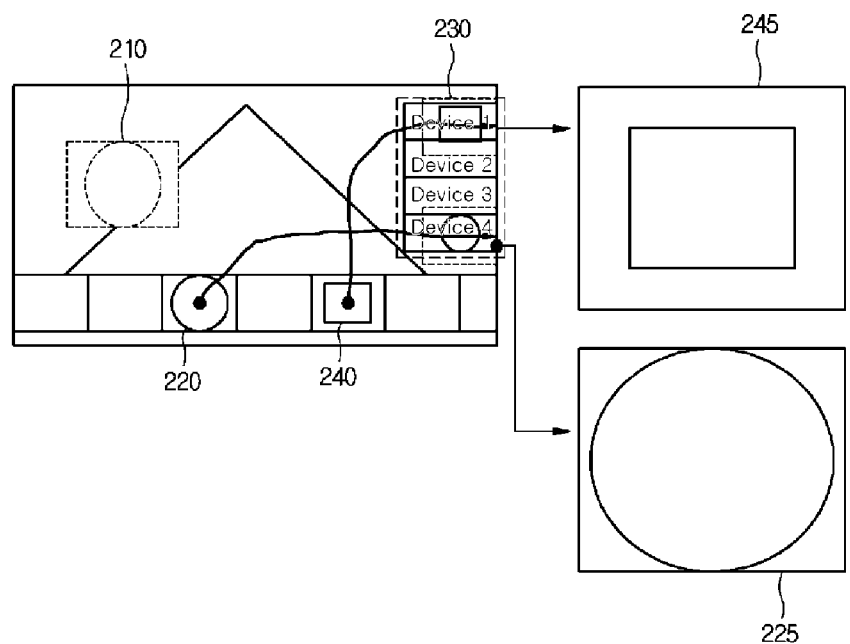
FIG. 5 is a schematic view of another example of the process in which the contents sharing apparatus according to at least one embodiment of the present disclosure shares contents for a plurality of devices.

FIG. 4 is a schematic view of one example of a process in which the contents sharing apparatus according to at least one embodiment of the present disclosure shares contents for a plurality of devices. FIG. 5 is a schematic view of another example of the process in which the contents sharing apparatus according to at least one embodiment of the present disclosure shares contents for a plurality of devices. The contents sharing apparatus 100 is connected with one or more external devices depending on communication module included in the communication unit 140. Therefore, the memory 120 comprises non-transitory computer readable recording medium and stores a predetermined instruction(s) and/or computer programmable language(s), read and implemented by the processor 130, to prevent the contents sharing apparatus 100 from being simultaneously connected to particular external devices. In addition, when the instruction is set to prevent the contents sharing apparatus 100 from being simultaneously connected with an already-connected device and another device to be newly connected, the processor 130 performs a process of releasing the connection with the already-connected device.

Hereinafter, it is assumed that the contents sharing apparatus 100 according to at least one embodiment of the present disclosure is not transmit an transmission image to devices 1 to 3 simultaneously and transmits a transmission image to device 4 and one of devices 1 to 3 simultaneously.

Referring to FIG. 4, when a user's touch input through the touch screen 110 of the contents sharing apparatus 100 is an input of dragging and dropping a third content 240 onto a device list area corresponding to device 1 (i.e., external device 245 as shown in FIG. 4), the processor 130 generates a transmission image obtained by mirroring the third content 240 and transmits it to device 1 through the communication unit 140. Thereafter, when a user's touch input through the touch screen 110 of the contents sharing apparatus 100 is an input of dragging and dropping the second content 220 onto a device list area 230 corresponding to device 3 (i.e., external device 225 as shown in FIG. 4), the processor 130 stops the generation and transmission of the third content 240 and terminates the connection with device 1. Thereafter, the processor 130 establishes connection with device 3, generate a transmission image of the second content 220, and transmit it to device 3.

However, the transmission image is simultaneously transmitted to device 4 and one of devices 1 to 3. Therefore, the processor 130 checks that the transmission image is simultaneously transmitted to the already-connected device to which the transmission image is being transmitted and the device to be newly connected according to the user touch input, connects with the new device while maintaining the transmission of the transmission image through the established connection, and transmit a new transmission image to the new device through the new connection.

Referring to FIG. 5, for example, when a user's touch input through the touch screen 110 of the contents sharing apparatus 100 is an input of dragging and dropping the third content 240 onto a device list area 230 corresponding to device 1, the processor 130 generates a transmission screen mirroring the third content 240 and transmits it to device 1 through the communication unit 140. Thereafter, when a user's touch input through the touch screen 110 of the contents sharing apparatus 100 is an input of dragging and dropping the second content 220 onto a device list area 230 corresponding to device 4, the processor 130 establish connection with device 4 while maintaining the generation and transmission of the transmission image of the third content 240, generate the transmission image of the second content 220, and transmit it to device 4.

At this time, the processor 130 of the contents sharing apparatus 100 ties and displays devices which do not maintain the simultaneous connection, in order to allow a user to recognize the fact that the transmission of the transmission screen to the already-connected device is stopped according to the drop of the content. For example, the processor 130 displays a single closed curve surrounding all areas corresponding to devices 1 to 3, indicating that devices 1 to 3 do not maintain the simultaneous connection.

In addition, the processor 130 displays different areas with different colors on a device list 230 corresponding to a currently-connected device of the devices or displays a mark indicating that the connection is maintained, on a corresponding area.

While it has been illustrated in the above that the contents sharing apparatus 100 maintains the displaying of the device list 230 on the touch screen 110, the processor 130 displays the device list only for a particular event without displaying the device list on the touch screen 110 at ordinary times. Hereinafter, a process of displaying a device list according to a user's input of dragging which is a particular event will be described in detail with reference to FIGS. 6A and 6B.

Figure 6A:
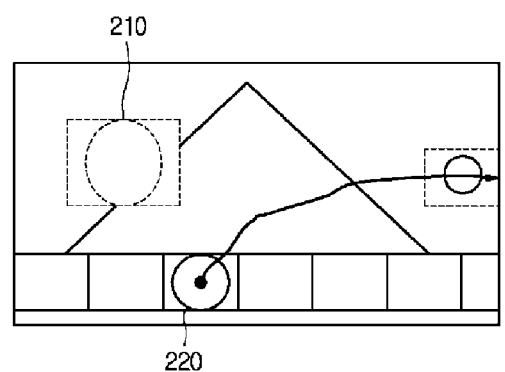
FIGS. 6A and 6B are schematic views of a process in which the contents sharing apparatus according to at least one embodiment of the present disclosure displays a device list.
Figure 6B:
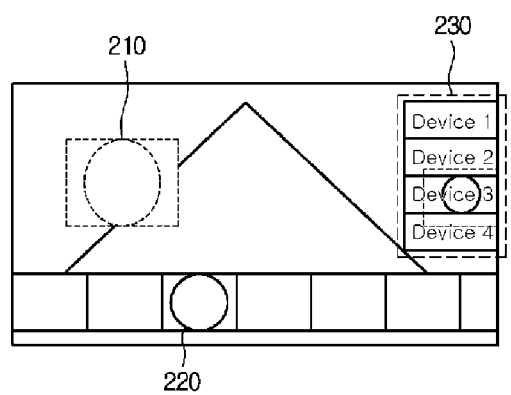

FIGS. 6A and 6B are views illustrating a process in which the contents sharing apparatus according to one embodiment of the present disclosure displays a device list.

Referring to FIGS. 6A and 6B, the processor 130 does not display a device list at ordinary times, as shown in FIG. 6A. In this case, a user selects and drags the second content 220 to one side edge (the right edge in FIG. 6A) of the screen. When the user's input of dragging is to drag the content to the one side edge of the screen, the processor 130 detects where the user's input of dragging occurs in the screen, and displays a device list 230 on the corresponding one side edge at which the dragging drops in the screen, as shown in FIGS. 6A and 6B. Accordingly, as the device list 230 is displayed, the user drops the corresponding content onto one area in the device list and hence shares the corresponding content with an external device. Although it has been described with reference to FIGS. 6A and 6B that the device list is displayed when the content is dragged to the one side edge of the screen, the processor 130 displays the device list on a predetermined area when the content is dragged to the predetermined area, depending on how to implement.

FIG. 7 is a schematic view of a screen on which a transmission image generated by the contents sharing apparatus according to at least one embodiment of the present disclosure is displayed.

Referring to FIG. 7, the processor 130 of the contents sharing apparatus 100 generates transmission images 510 and 520 and transmits them to external devices, respectively, through the communication unit 140. At this time, the processor 130 transmits the transmission images 510 and 520 to the respective external devices for displaying of the transmission images, while displaying the transmission images 510 and 520 on the touch screen 110.

At this time, the processor 130 transmits the transmission images including respective control interfaces 530 and 540 to the respective external devices. That is, the processor 130 modifies the transmission images to contain the respective control interfaces 530 and 540. In this case, each of the control interfaces indicates an interface for controls such as playback, pause, rewinding, fast forward and so on of contents corresponding to the transmission images.

Accordingly, each of the external devices displays the respective transmission image and receives a user's input of touching the respective control interface contained in the respective transmission image. For example, when an external device is a monitor equipped with a touch screen, the external device receives a transmission image containing a control interface from the contents sharing apparatus 100 and displays the transmission image on its own screen. At this time, upon detecting a user's touch, the external device generates input information according to the touch (for example, a coordinate value of a point at which the touch is detected) and transmit it to the contents sharing apparatus. Then, the processor 130 of the contents sharing apparatus 100 checks (detects) that the user touches the control interface according to the input information received from the external device, and controls playback of a content corresponding to the transmission image according to the user's touch input. Such operation control for the content transmitted to the external device is performed by the processor 130, independently of or simultaneously with control for contents in the main area of the contents sharing apparatus.

Accordingly, when the user's touches occur as per a user's preference and selection, the processor 130 detects the user's touches and controls playback of contents output from a plurality of devices, independently or simultaneously, through the respective devices.

Figure 8:
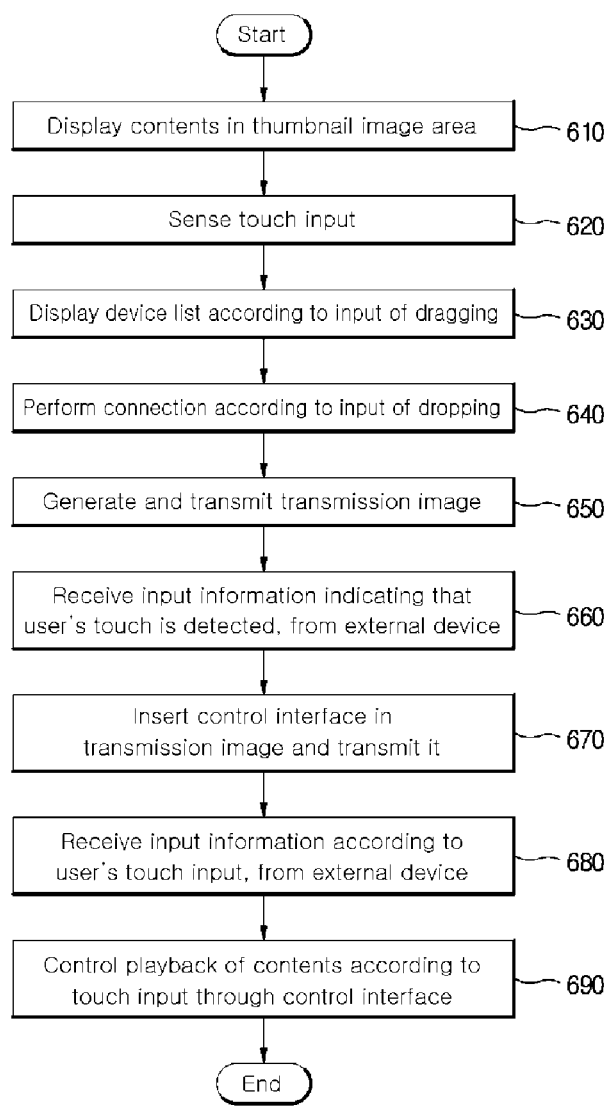
FIG. 8 is a flow chart of a process in which the contents sharing apparatus according to at least one embodiment of the present disclosure shares contents.

FIG. 8 is a flow chart of a process in which the contents sharing apparatus according to at least one embodiment of the present disclosure shares contents.

Referring to FIG. 8, at Step 610, the processor 130 of the contents sharing apparatus 100 displays one or more contents in the thumbnail image area 203. At this time, the contents are contents received from an external device through the communication unit 140, contents generated by a camera (not shown), and the like.

At Step 620, the processor 130 of the contents sharing apparatus 100 senses a user's touch input on the touch screen 110. In this case, the touch input is inputs on the touch screen 110, such as touch, drag and touch release (drop), from the user.

At Step 630, the processor 130 of the contents sharing apparatus 100 displays a device list according to a user's input of dragging. For example, when the user's input of dragging is to drag a content to an edge of the touch screen 110, the processor 130 of the contents sharing apparatus 100 displays the device list at an edge corresponding to the position to which the content is dragged.

At Step 640, the processor 130 of the contents sharing apparatus 100 performs connection for sharing of the contents according to a user's drop input. For example, when the user's drop input is to drop a content onto a certain area displayed in the device list, the processor 130 of the contents sharing apparatus 100 performs connection with an external device corresponding to the certain area.

At Step 650, the processor 130 of the contents sharing apparatus 100 generates a transmission image corresponding to the dragged content and transmits it to the external device.

At Step 660, the processor 130 of the contents sharing apparatus 100 receives input information indicating that a user's touch is detected, from the external device.

At Step 670, the processor 130 of the contents sharing apparatus 100 inserts a control interface in the transmission image generated at Step 650 and transmits it to the external device.

At Step 680, the processor 130 of the contents sharing apparatus 100 receives input information according to the user's touch input for the external device from the external device.

At Step 690, when the input information received at Step 680 indicates the touch input of touching the control interface, the processor 130 of the contents sharing apparatus 100 controls playback of the content according to the touch of the control interface. For example, when the user touches a 2X playback button (i.e., double speed playback button) of the control interface of the external device, the external device transmits input information according to the 2X playback button touch to the contents sharing apparatus 100. The contents sharing apparatus 100 checks the input information to recognize the 2X playback button touch and plays back the content at a double speed. In addition, the contents sharing apparatus generates a transmission image according to the 2X-played content and transmit it to the external device.

The above-described Step 540 is performed when the contents sharing apparatus 100 is not connected with the external device corresponding to the area onto which the content is dropped. When the contents sharing apparatus 100 has been previously connected with the external device corresponding to the area onto which the content is dropped, Step 640 is omitted. In addition, as described above with reference to FIG. 4, when content is dropped onto an area corresponding to a new device to which a transmission image does not be transmitted simultaneously with an already-connected device, the processor 130 of the contents sharing apparatus 100 releases the connection with the already-connected device and performs connection with the new device. On the contrary, as described above with reference to FIG. 5, when content is dropped onto an area corresponding to a new device to which a transmission image is transmitted simultaneously with an already-connected device, the processor 130 of the contents sharing apparatus 100 performs connection with the new device without releasing the connection with the already-connected device.

As described above, various embodiments of the present disclosure provide a user(s) with advantageous performance and effect in such a manner that the user(s) is able to easily input an instruction(s) to share contents with an external device through a touch screen of a mobile device.

As described above, various embodiments of the present disclosure is implemented by simply modifying a protocol in software without a modification in hardware. Accordingly, some embodiments of the present disclosure are able to be also implemented as computer readable codes on a non-transitory computer readable recording medium. The non-transitory computer readable recording medium is any data storage device that can store data which can be thereafter read by a computer system. Examples of the non-transitory computer readable recording medium include magnetic storage media (e.g., a magnetic tape, a floppy disk, a hard disk, etc.), optical recording media (e.g., a compact disk read only memory (CD-ROM) and a digital video disk (DVD), etc.)), magneto-optical media (e.g., a floptical disk, and hardware devices that are specially configured to store and execute program instructions, such as a ROM, a random access memory (RAM), a flash memory, etc.)

While the present disclosure has been particularly shown and described with reference to exemplary embodiments thereof, it will be understood by those skilled in the art that various changes in form and details are made therein without departing from the spirit and scope of the claimed invention. Specific terms used in this disclosure and drawings are used for illustrative purposes and not to be considered as limitations of the present disclosure. Therefore, the disclosed embodiments have to be construed as not limitative but illustrative. The accompanying claims and their equivalents are intended to cover such forms or modifications as would fall within the scope and spirit of the claimed invention.

What is claimed is:

1. An apparatus for sharing contents, comprising:
  a touch screen configured to sense a user input with respect to a graphical user interface for one or more of displaying or sharing contents wherein the graphical user interface is partitioned into (i) a main area for displaying one or more the contents and (ii) a device list area comprising a plurality of icons corresponding to external devices with which the apparatus is configured to be connected to share at least one of the contents; and
  a processor, including one or more application-specific integrated circuits (ASICs), configured to
    detect a first touch input received by the touch screen and generate a first electrical signal based on the first touch input,
    generate, in response to the first electrical signal, a first transmission image of a first content of the contents when the first touch input is detected and the first electrical signal indicates instructions for dragging the first content and dropping the first content onto a first external device among the external devices indicated in the device list area,
    connect the apparatus to the first external device to share the first content so that the first content is displayed on the first external device based on the first touch input,
    insert a control interface in the first transmission image,
    transmit the control interface to the first external device,
    control playback of the first content according to input information manipulating the control interface when the input information is received from the first external device,
    detect a second touch input received by the touch screen and generate a second electrical signal based on the second touch input,
    generate, in response to the second electrical signal, a second transmission image of a second content of the contents when the second touch input is detected and the second electrical signal indicates instructions for dragging the second content and dropping the second content onto a second external device among the external devices indicated in the device list area, connect the apparatus to the second external device to share the second content so that the second content is displayed on the second external device based on the second touch input, and release a connection with the first external device based on (1) a determination that the apparatus is connected with the first external device when the second touch input is detected, and (2) a determination that the apparatus is pre-set to prevent the apparatus from being simultaneously connected with the first external device and the second external device.

2. The apparatus of claim 1, wherein
the processor is further configured to
detect a third touch input received by the touch screen and generate a third electrical signal based on the third touch input, and
generate, in response to the third electrical signal, a third transmission image of a third content of the contents when the third touch input is detected and the third electrical signal indicates instructions for dragging the third content and dropping the third content onto the second external device among the external devices indicated in the device list area, and the apparatus further comprises:
a communication unit configured to
establish a connection with the first external device or the second external device based on the first touch input or the second touch input,
transmit the first transmission image to the first external device by way of an established connection with the first external device,
transmit the second transmission image to the second external device by way of an established connection with the second external device, and
transmit the third transmission image to the second external device by way of the established connection with the second external device based on the third touch input.

3. The apparatus of claim 1, wherein the icons corresponding to the external devices included in the device list area are displayed when the first touch input or the second touch input is received and the first electrical signal indicates instructions for dragging the first content to the device list area or the second electrical signal indicates instructions for dragging the second content to the device list area.

4. The apparatus of claim 3, wherein the icons corresponding to the external devices included in the device list area are displayed in one side edge of the graphical user interface when the first electrical signal indicates instructions for dragging the first content to the one side edge of the graphical user interface or the second electrical signal indicates instructions for dragging the second content to the one side edge of the graphical user interface.

5. The apparatus of claim 1, wherein the processor is further configured to
detect a third touch input received by the touch screen and generate a third electrical signal based on the third touch input,
generate, in response to the third electrical signal, a third transmission image of a third content of the contents when the third touch input is detected and the third electrical signal indicates instructions for dragging the third content and dropping the third content onto a third external device among the external devices indicated in the device list area, connect the apparatus to the third external device to share the third content so that the third content is displayed on the third external device based on the third touch input, and maintain a connection with the second external device based on (1) a determination that the apparatus is connected with the second external device when the third touch input is detected, and (2) a determination that the apparatus is pre-set to allow the apparatus to be simultaneously connected with the second external device and the third external device.

6. The apparatus of claim 1, further comprising:
a memory configured to store the instructions to share the contents.

7. A method performed by an apparatus for sharing contents, the apparatus including one or more application-specific integrated circuits (ASICs) to execute the method comprising:

displaying (i) a main area for displaying one or more the contents and (ii) a device list area comprising a plurality of icons corresponding to external devices with which the apparatus is configured to be connected to share at least one of the contents;

detecting a first touch input received by a touch screen of the apparatus and generating a first electrical signal based on the first touch input;

generating, in response to the first electrical signal, a first transmission image of a first content of the contents when the first touch input is detected and the first electrical signal indicates instructions for dragging the first content and dropping the first content onto a first external device among the external devices indicated in the device list area;

connecting the apparatus to the first external device to share the first content so that the first content is displayed on the first external device based on the first touch input, inserting a control interface in the first transmission image;

transmitting the control interface to the first external device;

controlling playback of the first content according to input information manipulating the control interface when the input information is received from the first external device; and detecting a second touch input received by the touch screen and generating a second electrical signal based on the second touch input;

generating, in response to the second electrical signal, a second transmission image of a second content of the contents when the second touch input is detected and the second electrical signal indicates instructions for dragging the second content and dropping the second content onto a second external device among the external devices indicated in the device list area;

connecting the apparatus to the second external device to share the second content so that the second content is displayed on the second external device based on the second touch input; and releasing a connection with the first external device based on (1) a determination that the apparatus is connected with the first external device when the second touch input is detected, and (2) a determination that the apparatus is pre-set to prevent the apparatus from being simultaneously connected with the first external device and the second external device.

8. The method of claim 7, further comprising:
detecting a third touch input received by the touch screen and generating a third electrical signal based on the third touch input;
generating, in response to the third electrical signal, a third transmission image of a third content of the contents when the third touch input is detected and the third electrical signal indicates instructions for dragging the third content and dropping the third content onto the second external device among the external devices indicated in the device list area;
establishing a connection with the first external device or the second external device based on the first touch input or the second touch input;
transmitting the first transmission image to the first external device by way of an established connection with the first external device;
transmitting the second transmission image to the second external device by way of an established connection with the second external device; and
transmitting the third transmission image to the second external device by way of the established connection with the second external device based on the third touch input.

9. The method of claim 7, further comprising:
causing the icons corresponding to the external devices included in the device list area to be displayed when the first touch input or the second touch input is received and the first electrical signal indicates instructions for dragging the first content to the device list area or the second electrical signal indicates instructions for dragging the second content to the device list area.

10. The method of claim 9, wherein the icons corresponding to the external devices included in the device list area are displayed in one side edge of the graphical user interface when the first electrical signal indicates instructions for dragging the first content to the one side edge of the graphical user interface or the second electrical signal indicates instructions for dragging the second content to the one side edge of the graphical user interface.

11. The method of claim 7, further comprising:
detecting a third touch input received by the touch screen and generate a third electrical signal based on the third touch input;
generate, in response to the third electrical signal, a third transmission image of a third content of the contents when the third touch input is detected and the third electrical signal indicates instructions for dragging the third content and dropping the third content onto a third external device among the external devices indicated in the device list area;
connect the apparatus to the third external device to share the third content so that the third content is displayed on the third external device based on the third touch input; and
maintaining a connection with the second external device based on (1) a determination that the apparatus is connected with the second external device when the third touch input is detected, and (2) a determination that the apparatus is pre-set to allow the apparatus to be simultaneously connected with the second external device and the third external device.

\* \* \* \* \*